United States Patent Office 2,819,233
Patented Jan. 7, 1958

2,819,233
CURING OF EPOXIDE RESINS WITH A CHELATE

Earl L. Smith and Ralph Hall, Fort Wayne, Ind., assignors to Phelps Dodge Copper Products Corporation, Fort Wayne, Ind.

No Drawing. Application June 11, 1953
Serial No. 361,086

1 Claim. (Cl. 260—18)

This invention relates to the curing of polyepoxide resins and especially to the conversion of such resins into insoluble, infusible products which are useful in varnishes, adhesives, encapsulating compounds, potting compounds, protective coatings, electrical insulating coatings, and the like. The invention has particular reference to an improved method for curing polyepoxide resins, and to a stable heat-curable amine-epoxy composition and method of making the same.

It is well known in the resin art that amine compounds are capable of converting polyepoxide resins to their infusible, insoluble state. The curing of these resins with amines, particularly polyamines, is disclosed, for example, in S. O. Greenlee Patents Nos. 2,510,885 and 2,585,115, dated June 6, 1950, and February 12, 1952, respectively. However, while a rapid conversion of the epoxide resins is provided by these amine compounds, particularly the diprimary amines such as ethylene diamine and diethylene triamine, the unconverted amine-epoxy compositions have the disadvantage of being unstable at room temperature. Accordingly, they are unsuitable for those applications (of which there are many) where varnish stability or compound stability prior to conversion is required.

It is also known that other curing agents, such as urea-formaldehyde, phenol formaldehyde and other heat reactive resins, will provide greater stability in varnishes or compounds using the polyepoxide resins, but at the sacrifice of curing speed. Moreover, the use of these other curing agents with the polyepoxide resins will not give the type of conversion required in many instances, as when the cured product is to be a wire enamel.

The principal objects of the present invention are to provide a reactive amine-epoxy composition which enables a rapid conversion of the epoxide resin and affords desired characteristics in the converted product, and yet avoids the inherent instability of the prior amine-epoxy compositions; to provide a stable amine-epoxide composition which is readily converted by heating above room temperature; and to provide methods for making the aforesaid composition and using it for the conversion of polyepoxide resins to their infusible, insoluble state.

According to the present invention, the curing agent for the polyepoxide resin is essentially a metal-amine chelate compound in which the amine nitrogen is held by the metal through a coordinate valence bond. This chelate compound may be prepared by reacting a polyamine with the organic salt of the metal, to form an amine-metal organic salt complex or coordination compound. The active hydrogen atoms of the amine groups are thus rendered inactive by the metal toward the reactive epoxide groups of the resinous polyepoxide at room temperature; but upon application of heat a number of active hydrogens provided by the amine groups are released and react with a number of epoxide groups, cross-linking the resinous polyepoxide and converting it to its insoluble, infusible state. The new amine-metal organic salt complex-polyepoxide composition has excellent stability and can be readily applied in solutions when thin films are desired. The reaction of the amine-metal organic salt complex with the polyepoxide resin, upon heating, gives unusual properties in the finished products, enabling the production of films or thick sections of excellent solvent resistance, flexibility in the films, hardness and toughness, heat resistance, and adhesion with a minimum amount of active amine.

The metal used in making the amine-metal organic salt complex or chelate compound is one which, when reduced to a salt by an organic acid and reacted with the polyamine, forms a coordinate valence bond holding the nitrogen of the amine groups. Examples of such metals are zinc, cobalt, manganese and copper. Examples of organic acids suitable for formation of the metal salt are aliphatic acids such as acetic, hexoic, 2-ethyl hexoic, and similar mono-functional organic carboxylic acids containing at least two carbon atoms, naphthoic, ricinoleate, phenol, cresol, and higher molecular weight phenolic derivatives of sufficient acidity to form an organic salt with the co-ordinating metal atom.

Polyamines suitable for reaction with the metal organic salt, to form the complex or chelate compound, are those which in themselves are capable of reacting with epoxide groups through active hydrogens provided by the different amine groups. Diethylene triamine has been found suitable.

The following describes the preparation of two examples of the soluble amine-metal organic salt complex according to the present invention:

Complex "A".—One mole of zinc oxide and two moles of 2-ethyl hexoic acid are reacted together in the presence of xylene to form the zinc salt of 2-ethyl hexoic acid, to which is added one mole of diethylene triamine. Thus, 90 grams of zinc oxide are reacted with 320 grams of 2-ethyl hexoic acid in the presence of 475 grams of commercial xylene to give the zinc salt of 2-ethyl hexoic acid. To this solution are added 115 grams of diethylene triamine, stirring gently until the reaction is complete. The resulting amine-metal organic salt complex is a clear solution containing 50.5% solids and .335 equivalent of diethylene triamine per 100 grams of amine-metal organic salt complex solution.

Complex "B".—One mole of finely divided zinc oxide is dispersed in 7.88 moles of mixed cresols, 1.38 moles of diethylene triamine are added slowly, and external heat is then applied to raise the complex solution to 140° C. and hold it at this temperature for 30 minutes. Thus, a clear amine-metal organic salt complex may be prepared by dispersing 81.4 grams of finely divided zinc oxide in 851.8 grams of mixed cresols, then, while agitating, adding 142.3 grams of diethylene triamine slowly, causing a controllable exothermic reaction in which the temperature increases to 80° C., and then increasing the temperature over a period of one hour to 140° C. and holding it there for 30 minutes. This results in a clear solution having a viscosity of 30 poises, a non-volatile content of 39.5%, and containing .389 equivalent of diethylene-triamine per 100 grams of amine-metal organic salt complex solution.

The polyepoxides used for reaction under heat with the amine-metal organic salt complex contain an average of more than one epoxide group per molecule which will react with the amine groups to form addition reaction products. The polyepoxides disclosed in the aforesaid Greenlee Patents Nos. 2,510,885 and 2,585,115 are suitable for this purpose. Thus, the resin used according to the present invention may be defined as an epichlorhydrin-di(hydroxyphenyl) dimethyl methane product which is free from functional groups other than epoxide and hydroxyl groups and having a 1, 2 epoxide equivalency of greater than 1. In the following Table I are examples of polyepoxide compositions resulting from the reaction of bisphenol with varying proportions of epichlorohydrin in the presence of sodium hydroxide, the table giving the softening points of the resin, the equivalent weight per epoxide, and the average molecular weight:

TABLE I

| Resin | Melting Point, Degrees Centigrade | Equivalent Weight per Epoxide | Molecular Weight |
| --- | --- | --- | --- |
| 1 | 8-12 | 190-210 | 350 |
| 2 | 20-28 | 225-290 | 450 |
| 3 | 40-45 | 300-375 | 700 |
| 4 | 64-76 | 450-525 | 900 |
| 5 | 95-105 | 870-1,025 | 1,400 |
| 6 | 127-133 | 1,550-2,000 | 2,900 |
| 7 | 145-155 | 2,400-4,000 | 3,800 |

The above-listed resins are available under the trademark "Epon" resins, and others are also available commercially.

The polyepoxide resin may be dissolved in a suitable solvent to give, for example, a 30% solution, followed by addition of the amine-metal organic salt complex in an amount sufficient to give a minimum of .1 equivalent of active amine groups per epoxide equivalent. The resulting varnish is stable at ordinary temperatures but is readily converted by heat into an insoluble and infusible coating, as when a thin film of the varnish is baked for 10 minutes at 400° F. The following Examples I and II illustrate the production of such a varnish:

*Example I*

90 parts of epoxide resin #4 are dissolved in 105 parts of xylene and 105 parts of the butyl ether of ethylene glycol to give a 30% solution, and to this product are added 23.5 parts of Complex "A." The resulting varnish, when spread in a thin film of .005" thickness over a glass or copper sheet and baked for 10 minutes at 400° F., results in a hard, tough, insoluble, and infusible coating. The ratio of equivalents of active amine groups to epoxide groups is .43.

*Example II*

90 parts of epoxide resin #4 are dissolved in 105 parts of xylene and 105 parts of the butyl ether of ethylene glycol to give a 30% solution, and to this product are added 20.4 parts of Complex "B." The resulting varnish, when spread in a thin film of .005" thickness over a glass or copper sheet and baked for 10 minutes at 400° F., results in a hard, tough, insoluble and infusible coating. The ratio of equivalents of active amine groups to epoxide groups is .43.

The varnishes of the above examples illustrate a characteristic feature of the present invention, namely, that unlike the amine-epoxy compositions produced heretofore, these varnishes have a high degree of stability at ordinary temperatures prior to conversion, in addition to excellent flexibility, adhesion, and chemical and heat resistance in the cured state. This stability can be measured by sealing varnish samples in glass or metal containers, storing them at room temperature, and then periodically measuring their viscosities with an instrument such as the Brookfield rotational viscosimeter. These measurements show a low rate of viscosity increase. On the other hand, a conventional amine-epoxy varnish, prepared to give the same ratio of active amine groups to epoxide groups but without the metal organic salt, shows a high rate of viscosity increase and becomes unusable after a few hours from time of preparation. The following Example III illustrates the preparation of such a conventional varnish:

*Example III*

90 parts of epoxide resin #4 are dissolved in 105 parts of xylene and 105 parts of the butyl ether of ethylene glycol to give a 30% solution, and to this product are added 2.7 parts of diethylene triamine. The resulting varnish, when spread in a thin film of .005" thickness over a glass or copper sheet and baked for 10 minutes at 400° F., results in a hard, tough, insoluble, and infusible coating. The ratio of active amine groups to epoxide groups is .43.

A comparison of varnish viscosities after aging periods, of the varnishes in Examples I, II and III, appears in Table II.

TABLE II

| Example | Ratio of Active Groups to Epoxide Groups | Viscosity After Aging | | | | |
| --- | --- | --- | --- | --- | --- | --- |
| | | Original | 24 Hrs. | 48 Hrs. | 120 Hrs. | 336 Hrs. |
| I | .43 | 26 | 26.3 | 26.5 | 27.5 | 30 |
| II | .43 | 36 | 42.5 | 43.5 | 55 | 134 |
| III | .43 | 32 | 74 | 324 | Gel | |

The solvent used in the preparation of the amine-metal organic salt complex may be removed by vacuum distillation or drying, and the remaining viscous complex combined with the fluid resinous polyepoxide to form solventless varnishes and encapsulating and potting compounds. These are stable at room temperature but are readily heat-converted to the insoluble and infusible state. This is illustrated in the following example:

*Example IV*

The amine-metal organic salt complex from Complex "A" is dried at 50° C. to remove a major portion of the xylene and give a viscous complex solution of 94.6% solids and an amine equivalent of .628 per 100 grams. 3.1 grams of the high solids complex are added to 20 grams of polyepoxide resin #2. This mixture, after being thoroughly blended, does not react at room temperature even after 48 hours, and after being heated for 24 hours at 50° C. is gelled only slightly. However, heating for two hours at 125° C. converts the mixture into an insoluble and infusible compound. The ratio of equivalents of active amine groups to epoxide groups is .25.

It will be apparent from the above that the present invention permits the formulation of a stable "one package" reactive amine-epoxy compound, with all of its attendant advantages. This has been impossible heretofore because of the necessity of adding the reactive amine or coupling agent to the polyepoxide at the time of, or immediately prior to, its use as a solventless varnish or potting compound, as illustrated by the following example:

*Example V*

.67 gram of diethylene triamine are added to 20 grams of polyepoxide resin #2, and the mixture, after being thoroughly blended, is allowed to stand at room temperature. Within 15 to 20 minutes of blending, an exothemic reaction is evident, resulting in the conversion of the epoxide resin into an insoluble and infusible composition. If a larger mass of the resin has been catalyzed with the amine, the exothermic reaction reaches such proportions as to cause the resin to froth and bubble and to be unsuitable for use as an encapsulating or potting compound. The ratio of equivalents of active amine groups to epoxide groups is .25, as in the previous Example IV.

Not only may thick sections or large masses be cured through the practice of this invevntion, as illustrated in Example IV, but also the cured compositions possess greater hardness, toughness, and impact strength than compositions manufactured according to prior practices as illustrated in Example V.

The amine-metal organic salt complex-resinous polyepoxide compositions may be modified through the addition of such materials as alkyd and polyester resins, vinyl formal and other vinyl acetal resins, styrene-maleic acid co-polymers, urea formaldehyde and melamine formaldehyde condensation products, vinyl chloride, vinyl chloride and vinyl acetate co-polymers, phenolic resins, pigments, fillers, and coloring materials to form products of even greater value for specific application requirements. An example of such a modification is described below.

*Example VI*

A metal phenolic complex is made by placing 504 grams of mixed phenols (Reilly's Cresol #3) and 48 grams of zinc oxide in a reaction flask, to which is added diethylene triamine in an amount sufficient to make the resulting reaction product a dark clear viscous resin solution containing 40.1% solids. To obtain this viscous metal-amine complex, the amine is added slowly, the temperature rising to 80° C., and the mixture is then heated to 140° C. within 1 hour, cooled to 90° C., and then reheated to 130° C. in the presence of $CO_2$ for 2 hours. A polyester is made by reacting 486 grams of triethylene glycol and 514 grams of 3.6 endomethylene Δ 4 tetrahydro phthalic anhydride in a still to a temperature of 210° C., while distilling off the water of condensation until the resultant resinous reaction product has an acid number less than 25. Then 44.0 grams of this polyester are added to 25.5 grams of the viscous metal complex, and 13.7 grams of the mixed phenols added to obtain a solution of a polyester-metal-amine-phenol complex containing 65% solids.

One thousand grams of epoxide resin #5 are dissolved in 1500 grams of solvent made by combining 750 grams of commercial xylene with 750 grams of acetone free diacetone alcohol, using stirring and gentle heating. To this solution are added 1028 grams of the above-mentioned solution of the polyester-metal-amine-phenol complex, diluted by the addition of 639 grams of commercial xylene. The resulting insulating varnish concentrate, containing 40% solids, is further reduced to 23.5% to 24.5% solids and a viscosity of .50 to .52 minute when measured with a #1 Zahn cup at 100° F., by adding a solvent made by combining 65 parts of commercial xylene with 35 parts of acetone free diacetone alcohol.

The varnish of the foregoing example may be used to particular advantage for the coating of magnet wire. For example, round copper wire of .0179 inch diameter was enameled with the use of a commercial type electrically heated enameling oven and conventional flow methods, applying six coats of varnish to each wire and baking each coat at a maximum temperature of 710° F. with a dwell in the heating chamber of 23 seconds, thereby obtaining a diameter increase of .0022 inch. The resulting insulated electrical conductor exhibited excellent physical, chemical and electrical properties, including a high resistance to "cut-through" and long life at 125° C., and a high dielectric strength after seven days' aging at 200° C.

As previously mentioned, the metal-amine chelate compound may be made from the salt of a metal other than zinc. For example, polyamine (such as diethylene triamine) complexes of cuprous and cupric chloride and acetate, cobalt chloride, acetate and octoate, and manganese octoate, as well as zinc chloride, acetate and octoate, are all potent curing agents for the epoxy resins and are stable at room temperature. The selection of the particular metal and its organic salt used to make the metal-amine chelate compound will depend in general upon such factors as economy and convenience, the solubility of the salt, the desired flow characteristics, etc. Also, the proportions of the chelate compound and the polyepoxide resin may be varied over a wide range, and for any selected proportion the complex cures the epoxy resin with a relatively small amount of amine as compared to the amount required when the amine is used directly, that is, without the metal organic salt, as in prior practices. In general, the flow characteristics and the flexibility of the cured product are improved as the ratio of the metal amine chelate compound to the polyepoxide resins is decreased. For most purposes, the ratio of active amine groups to epoxide groups will be .1:1 to 5:1, although much higher ratios can be used. The flow characteristics may be improved, if desired, by the addition of flow control agents, such as the solvents dimethyl formamide, ethylene glycol, diacetone alcohol, xylene (or mixtures thereof) and urea resins (such as "Beetle 227–8" sold by American Cyanamid Co.).

The soluble amine-metal organic salt complexes previously described as Complexes "A" and "B" both employ zinc as the metal. The preparation of other complexes of this character using other metals, and examples of curing polyepoxide resins with these other complexes, will now be described.

*Complex "C."*—To one mole of cadmium ricinoleate is added 1.66 moles of diethylene triamine in the presence of xylene and the butyl ether of ethylene glycol. Thus 20 grams of cadmium ricinoleate are dispersed in 20 grams of xylene and 4.94 grams of the butyl ether of ethylene glycol, to which is added 4.94 grams of diethylene triamine, stirring gently until the reaction is complete. This results in a clear solution containing 50% solids as amine-metal organic salt complex and containing .288 equivalent of diethylene triamine per 100 grams of amine-metal organic salt complex solution.

*Example VII*

To 10 grams of polyepoxide resin #1 are added 17.4 grams of Complex "C." To insure clarity of solution, 5 grams of N-butanol and 5 grams of the butyl ether of ethylene glycol are added. The resulting varnish, containing 50% solids, is stable at room temperature, but is readily heat converted to the insoluble and infusible state by heating thin films of the varnish at 113° C. for 1 hour. The ratio of equivalents of active amine groups to epoxide groups is .25.

*Complex "D."*—An amine-metal organic salt complex may be made by adding diethylene triamine to manganese naphthenate drier of 6% manganese metal content and stirring until the reaction is complete. Thus 10.3 grams of diethylene triamine are slowly added to 91.3 grams of Nuodex 6% manganese naphthenate with gentle stirring. The resulting amine-metal naphthenate complex is a viscous solution containing .3 equivalent of diethylene triamine per 100 grams of complex solution and 1 mole of diethylene triamine per mole of drier metal.

*Example VIII*

To 60 grams of polyepoxide resin #1 are added 10 grams of the amine-manganese naphthenate complex from "D" above. To insure clarity, 10 grams of N-butanol and 20 grams of xylene are added. The resulting varnish is stable at room temperature, but will cure to the insoluble and infusible state when thin films are baked for 2 hours at 150° C.

The ratio of equivalents of active amine groups to epoxide groups is .1 to 1.

*Complex "E."*—An amine-metal organic salt complex may be made by adding diethylene triamine to lead oilsolate of 20% lead content, stirring until the reaction is complete. Thus 10.3 grams of diethylene triamine are added to 103.6 grams of 20% lead oilsolate drier solution with gentle agitation until the reaction is complete. The resulting amine-lead oilsolate complex is a clear fluid solution containing .265 equivalent of diethylene triamine per 100 grams of complex lead oilsolate solution and 1 mole of amine per mole of drier metal.

*Example IX*

To 100 grams of polyepoxide resin #1 are added 11.9 grams of N-butanol to insure clarity and 18.9 grams of the amine-lead oilsolate complex solution from "E" above. The resulting varnish is stable at room temperature, but will cure to the insoluble and infusible state when thin films of the varnish are baked at 150° C. for 1 hour. The ratio of equivalents of amine groups to epoxide groups is .1.

*Complex "F."*—An amine-metal organic salt complex may be made by adding diethylene triamine to cobalt naphthenate in the presence of xylene and butanol to insure clarity. Thus 10.3 grams of diethylene triamine are added to 98.16 grams of Nuodex 6% cobalt naphthenate drier solution in the presence of 20 grams of N-butanol and 10 grams of xylene. The resulting mixture is stirred gently until the reaction is complete. The resulting amine-cobalt naphthenate complex is a clear fluid solution containing .218 equivalent of diethylene triamine per 100 grams of complex cobalt naphthenate solution and 1 mole of amine per mole of drier metal.

*Example X*

To 100 grams of polyepoxide resin #1 are added 40 grams of N-butanol, 20 grams xylene, 20 grams of the butyl ether of ethylene glycol to insure clarity, and 23 grams of the amine-cobalt naphthenate complex solution from "F" above. The resulting varnish is stable at room temperature, but will cure to the insoluble and infusible state when thin films of the varnish are baked at 150° C. for 1 hour. The ratio of equivalents of active amine groups to epoxide groups is .1.

The various metals used in the examples of the complex previously described may be referred to collectively as polyvalent drier metals.

We claim:

A method of preparing a stable amine-epoxy composition adapted to be heat-cured, comprising forming a soluble amine-metal organic salt chelate by reacting diethylene triamine with the organic salt of a metal of the class consisting of zinc, cobalt, manganese and copper which forms a coordinate valence bond holding the nitrogen of the amine groups, and mixing substantial proportions of the soluble chelate and an epoxide resin which is an epichlorhydrin di (hydroxyphenyl) dimethyl methane product and which is free from functional groups other than epoxide and hydroxyl groups and having a 1,2 epoxide equivalency of greater than 1, the acid radical of said salt being the acid radical of an acid selected from the group consisting of monofunctional organic carboxylic acids containing at least two carbon atoms and monohydric phenols.

References Cited in the file of this patent

UNITED STATES PATENTS

| | | |
|---|---|---|
| 2,528,933 | Wiles | Nov. 7, 1950 |
| 2,681,901 | Wiles et al. | June 22, 1954 |
| 2,742,448 | Beacham | Apr. 17, 1956 |